(12) United States Patent
Singhal

(10) Patent No.: US 8,213,708 B2
(45) Date of Patent: Jul. 3, 2012

(54) ADJUSTING PERSPECTIVE FOR OBJECTS IN STEREOSCOPIC IMAGES

(75) Inventor: Amit Singhal, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 275 days.

(21) Appl. No.: 12/728,356

(22) Filed: Mar. 22, 2010

(65) Prior Publication Data

US 2011/0229012 A1 Sep. 22, 2011

(51) Int. Cl.
*G06K 9/00* (2006.01)
(52) U.S. Cl. ........................................ 382/154
(58) Field of Classification Search .................. 382/154
See application file for complete search history.

(56) References Cited

U.S. PATENT DOCUMENTS

| | | | | |
|---|---|---|---|---|
| 5,850,352 | A * | 12/1998 | Moezzi et al. | 345/419 |
| 6,125,198 | A * | 9/2000 | Onda | 382/154 |
| 6,606,406 | B1 * | 8/2003 | Zhang et al. | 382/154 |
| 2004/0027451 | A1 * | 2/2004 | Baker | 348/46 |
| 2007/0081716 | A1 * | 4/2007 | Ha et al. | 382/154 |
| 2008/0112616 | A1 | 5/2008 | Koo et al. | |

OTHER PUBLICATIONS

Criminisi et al., "Region Filling and Object Removal by Exemplar-Based Image Inpainting," IEEE Transactions on Image Processing, vol. 13 (2004).

Whyte et al., "Get out of my picture! Internet-based inpainting," Proc. British Machine Vision Conference, 2009.

Osberger et al., "Automatic Identification of Perceptually Important Regions in an Image," Proc. IEEE International Conference on Pattern Recognition, pp. 701-704 (1999).

Luo et al, "A computational approach to determination of main subject regions in photographic images," Image and Vision Computing, vol. 22, pp. 227-241 (2004).

Patwardhan et al., "Projection based image and video inpainting using wavelets," Proc. International Conference on Image Processing, pp. 857-860 (2003).

Esedoglu et al., "Digital inpainting based on the Mumford-Shah-Euler image model," European Journal of Applied Mathematics, vol. 13, (2002).

\* cited by examiner

*Primary Examiner* — Stephen R Koziol
(74) *Attorney, Agent, or Firm* — Kevin E. Spaulding

(57) ABSTRACT

A method for manipulating a stereoscopic image, comprising receiving an original stereoscopic image including a left image and a right image; identifying one or more objects; determining actual object sizes and actual object locations in both the left and right images; determining original perceived three-dimensional object location and new perceived three-dimensional object locations for the identified one or more objects; determining a size magnification factors and location displacement values for each of the one or more objects; generating a new stereoscopic image by changing the actual object sizes and the actual object locations responsive to the corresponding size magnification factors and location displacement values; and storing the new stereoscopic image in a processor-accessible memory system.

13 Claims, 5 Drawing Sheets

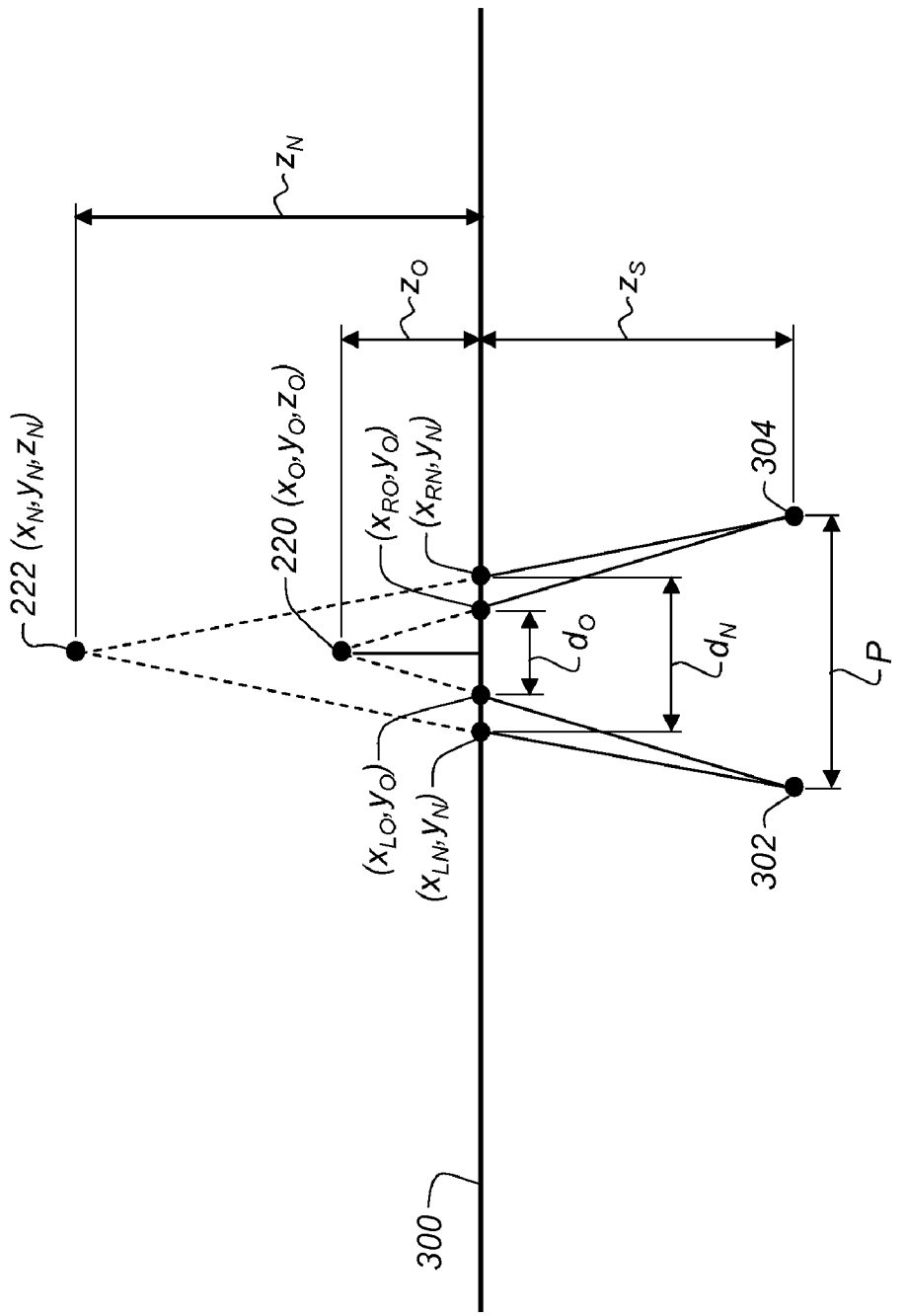

ADJUSTING PERSPECTIVE FOR OBJECTS IN STEREOSCOPIC IMAGES

CROSS-REFERENCE TO RELATED APPLICATIONS

Reference is made to commonly assigned, co-pending U.S. Patent Application Publication No. 2011/0026764, entitled "Detection of Objects using Range Information," by Wang, and to commonly assigned, co-pending U.S. Patent Application Publication No. 2011/0026807, entitled: "Adjusting Perspective and Disparity in Stereoscopic Image Pairs," by Wang, both of which are incorporated herein by reference.

FIELD OF THE INVENTION

This invention relates to adjusting digital images, and more particularly to adjusting the virtual location of particular objects of interest in a stereoscopic image.

BACKGROUND OF THE INVENTION

Stereo cameras, or multi-view cameras, generally capture left and right images using two or more cameras functioning similarly to human eyes. When the left and right images are presented to the left and right eyes of a viewer, the viewer perceives a stereoscopic effect due to disparities between the two images. Specifically, the disparities between corresponding pixels in the left eye/right eye image pair create binocular parallax which is perceived by the viewer as a stereoscopic effect. The amount of parallax is related to the amount of disparity between pixels in the scene, and can be controlled to change the perceived stereoscopic effect.

Methods for adjusting the global parallax of a stereoscopic image pair are well-known in the art. These methods change the parallax for an entire scene, and do not provide a means for adjusting the disparities of local objects differently. For example, U.S. Patent Application Publication 2008/0112616 uses a disparity histogram to adjust the global parallax of a stereoscopic image pair.

There remains a need for a method to adjust the disparities of individual objects in a scene, in essence, moving their stereoscopic location with respect to the remainder of the scene.

SUMMARY OF THE INVENTION

The present invention represents a method for manipulating an original stereoscopic image, comprising:

a) receiving the original stereoscopic image including a left image and a right image;

b) identifying one or more objects represented in both the left and right images;

c) determining actual object sizes and actual object locations of the identified one or more objects in both the left and right images;

d) determining original perceived three-dimensional object locations for the identified one or more objects responsive to the actual object locations in the left and right images;

e) determining new perceived three-dimensional object locations for the identified one or more objects;

f) determining a size magnification factor for each of the one or more objects based at least upon the original perceived three-dimensional object location and the new perceived three-dimensional object location for the corresponding object;

g) determining location displacement values for each of the one or more objects based at least upon the original perceived three-dimensional object location and the new perceived three-dimensional object location for the corresponding object;

h) using a data processing system to generate a new stereoscopic image including a new left image and a new right image by changing the actual object sizes and the actual object locations for the one or more objects responsive to the corresponding size magnification factors and location displacement values; and i) storing the new stereoscopic image in a processor-accessible memory system.

The present invention has the advantage that it provides a method for adjusting the perceived three-dimensional position of individual objects in a stereoscopic image with respect to the rest of the scene. The perceived three-dimensional location is adjusted by determining a size magnification factor and a location displacement value for each individual object in response to user-specified input.

It has the additional advantage that the user can specify an additional scale factor to further control the perceived size of individual objects according to a user preference.

In addition to the embodiments described above, further embodiments will become apparent by reference to the drawings and by study of the following detailed description.

BRIEF DESCRIPTION OF THE DRAWINGS

FIG. 5 is a diagram illustrating a change in image disparity associated with moving an object to a new three-dimensional object location.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image," as used herein, refers to any digital image, such as a digital still image or a digital video image.

Figure 1:
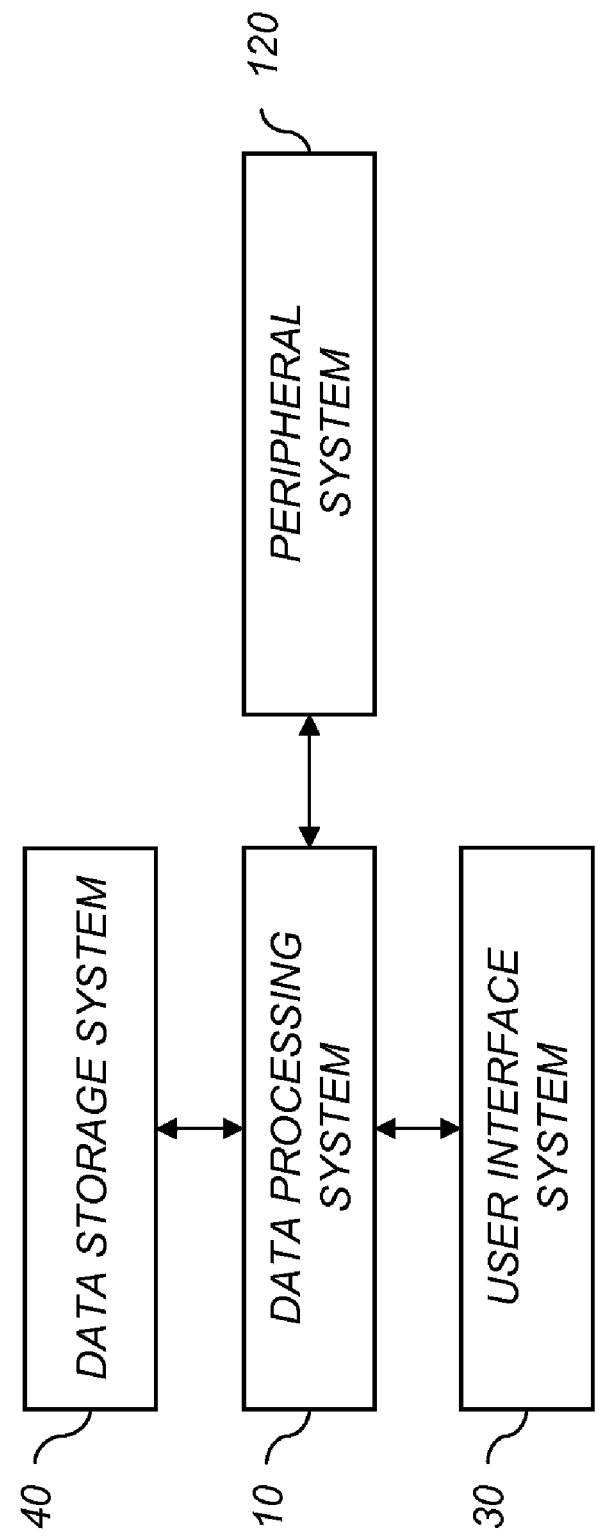
FIG. 1 is a high-level diagram showing the components of a system for adjusting three-dimensional object locations in a stereoscopic image according to an embodiment of the present invention.

FIG. 1 is a high-level diagram showing the components of a system for adjusting three-dimensional object locations in a stereoscopic image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
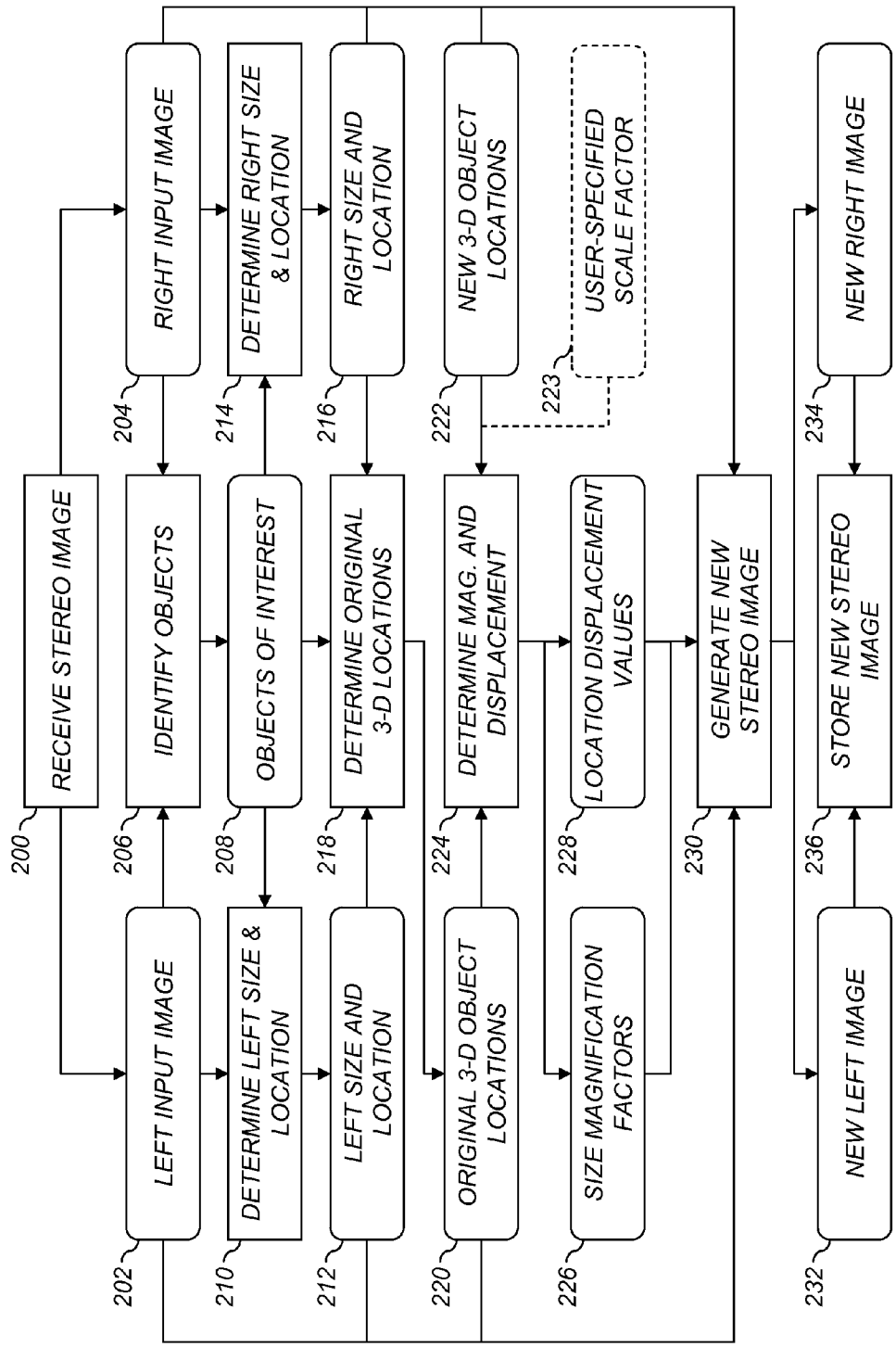
FIG. 2 is a flow chart illustrating a method for adjusting three-dimensional object locations in a stereoscopic image according to an embodiment of the present invention.

FIG. 2 illustrates a method for adjusting perspective and disparity for objects in a stereoscopic image pair according to an embodiment of the present invention. The method includes a receive stereo image step 200 which receives an input stereoscopic image including a left input image 202 and a right input image 204, corresponding to left and right view points, respectively. One of ordinary skill in the art will appreciate that the input stereoscopic image can also include more than two input images corresponding to additional viewpoints, and that the method of the present invention can be generalized to process any number of input images.

Methods for generating stereoscopic images are well-known to those skilled in the art. In one embodiment of the present invention, the left input image 202 and the right input image 204 are digital still images captured using a stereo image capture device. The stereo image capture device can, for example, be a parallel camera, a multi-view camera, a single lens camera, or a hybrid stereo image camera. In another embodiment, the left input image 202 and the right input image 204 can be corresponding image frames of a stereo video sequence captured by a stereo video capture device. In other embodiments, the left input image 202 and the right input image 204 are still images or video images captured with a traditional film camera that have been digitized to produce digital images, or are computer generated images generated using well-known computer graphics techniques.

An identify objects step 206 is used to identify one or more objects of interest 208 in the input stereoscopic image. In some embodiments, the one or more objects of interest 208 may be foreground objects, or main subjects, automatically identified using known computer vision techniques known to those skilled in the art. For example, the article "Automatic Identification of Perceptually Important Regions in an Image" by Osberger et al. (Proc. IEEE International Conference on Pattern Recognition, pp. 701-704, 1999) teaches how to determine perceptually salient regions in an image based on a model derived from human visual attention data. Another method is described by Luo et al. in the article "A computational approach to determination of main subject regions in photographic images," (Image and Vision Computing, Vol. 22, pp. 227-241, 2004). This method involves computing a number of structural and semantic saliency features in an image, and integrating them using a probabilistic reasoning engine.

In another embodiment, the one or more objects of interest 208 may be identified through a control signal received by the system from the viewer. In other embodiments, the objects of interest 208 may be identified by user selection, automatic detection by an image processing method known in the art, or combinations thereof.

A determine left size and location step 210 is used to determine a left size and location 212 representing the size and location for each of the objects of interest 208 in the left input image 202. Similarly, a determine right size and location step 214 is used to determine a right size and location 216 representing the size and location for each of the objects of interest 208 in the right input image 204. In a preferred embodiment, the determine left size and location step 210 and the determine right size and location step 214 include a segmentation step that segments the objects of interest 208 in the left input image 202 and the right input image 204, respectively, to create a segmentation mask for each object of interest. Any image segmentation method known to those skilled in the art can be used to determine segmentation masks. Most image segmentation algorithms involve analyzing an image to determine boundaries between image regions having different color or spatial characteristics. U.S. patent application Ser. No. 12/510,431 to Wang, entitled "Detection of Objects using Range Information," teaches a method for segmenting a stereoscopic image using range information. In one embodiment of the present invention, this image segmentation method is used to identify the objects of interest 208.

In some embodiments, the segmentation step includes further refinement of die segmentation results based upon interactions with the viewer. In some embodiments, regions of the left input image 202 and the right input image 204 not present in the segmentation mask are considered to be background regions.

The size and location of the objects of interest in the segmentation masks can be determined using any method known to those in the art. In one embodiment, the size of an object of interest is defined by the smallest bounding box that can enclose the segmented object in the corresponding input image. The width and height of the bounding box can then be used to define the width ($w_O$) and height ($h_O$) of the object of interest.

In one embodiment, the location of the object of interest can be defined by determining the center location of the bounding box. Alternately, the location of the object of interest can be defined using some other metric such as the centroid of the segmented region.

Figure 3:
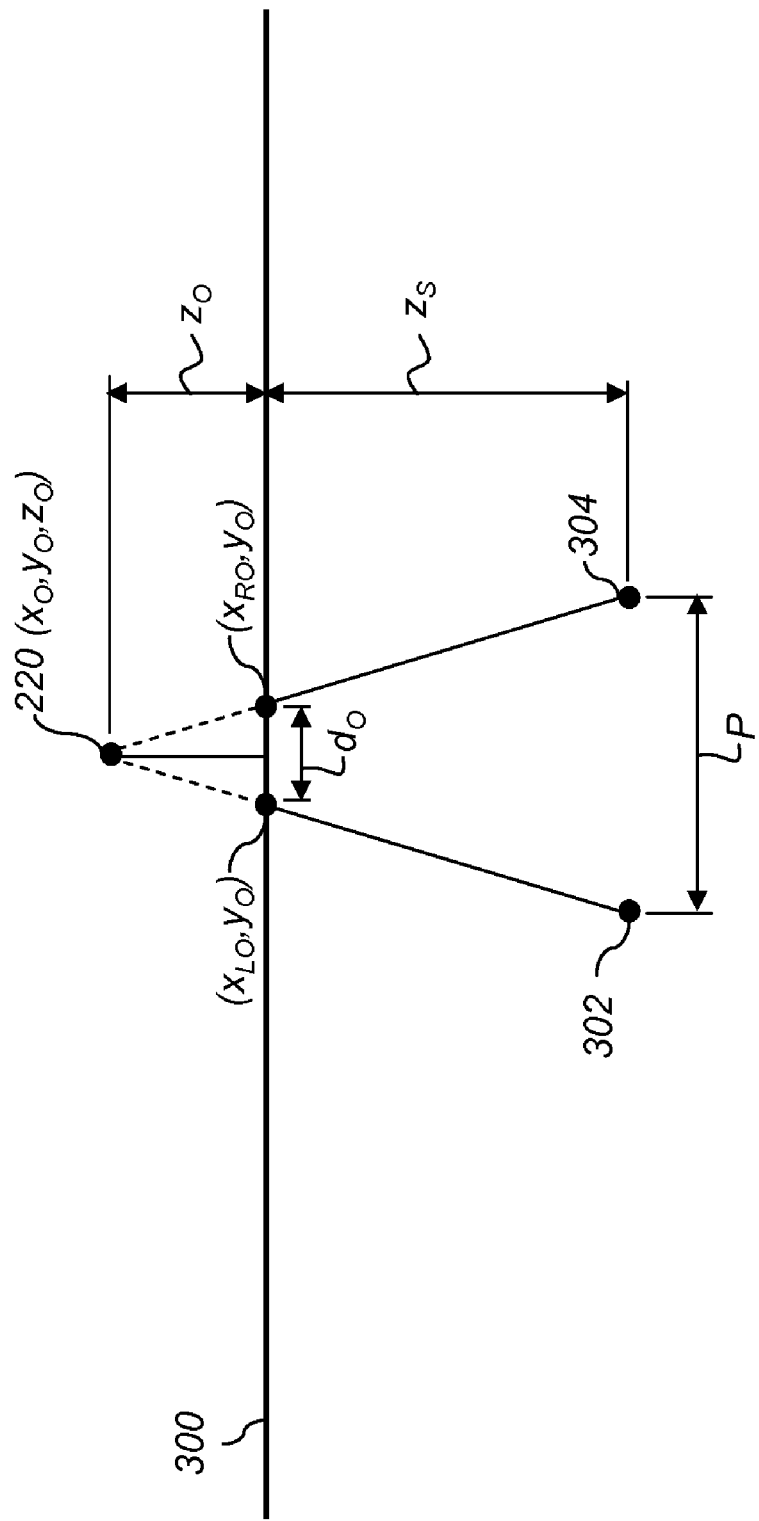
FIG. 3 is a diagram illustrating how a three-dimensional object location can be determined from corresponding object locations in left and right input images.

A determine original three-dimensional (3-D) location step 218 is used to determine original 3-D object locations 220 for each of the one or more objects of interest 208. The original 3-D object locations 220 are determined from the relative locations of the objects of interest in the left input image 202 and the right input image 204. Consider the example shown in FIG. 3 which illustrates a stereoscopic image presented on a viewing screen 300 located at a screen distance $z_S$ from a left viewpoint 302 and a right viewpoint 304, which are separated by a distance P. The left viewpoint 302 and a right viewpoint 304 correspond to the locations of the left and right eyes of a viewer, respectively. The two-dimensional (2-D) object location for an object of interest in the left input image 202 (FIG. 2) is given by ($x_{LO}$, $y_O$), corresponding to the left size and location 212. Similarly, the two dimensional object location for the object of interest in the right input image 204 (FIG. 2) is given by ($x_{RO}$, $y_O$), corresponding to the right size and location 216. Note that the object location in the y-dimension ($y_O$) will generally be the same in both the left input image 202 and the right input image 204, and will be equal to the y-coordinate for the original 3-D object location 220, although this is not a limitation. The x-coordinate ($x_O$) for the original 3-D object location 220 will be given by:

$$x_O = (x_{LO} + x_{RO})/2. \qquad (1)$$

The z-coordinate ($z_O$) for the original 3-D object location 220 can be determined from the disparity ($d_O = x_{RO} - x_{LO}$) between the object locations in the left and right images using the following equation:

$$z_O = \frac{z_S(x_{RO} - x_{LO})}{P - (x_{RO} - x_{LO})} = \frac{z_S d_O}{P - d_O}. \qquad (2)$$

Note that when $d_O < 0$, corresponding to $x_{RO} < x_{LO}$, the resulting $z_O$ value will be negative corresponding to original 3-D object location 220 that is in front of the screen.

A determine magnification and displacement step 224 is used to determine size magnification factors 226 and location displacement values 228 for each of the one or more objects of interest 208, responsive to the original 3-D object locations 220 and new 3-D object locations 222. In a preferred embodiment, the new 3-D object locations 222 are received from a user. For example, the new 3-D object locations 222 can be specified by the user using a graphical user interface. In one embodiment of the present invention, the new 3-D object location 222 is specified by a new depth position ($z_N$) for the object of interest. In other embodiments, the new object location can also include new horizontal and vertical positions ($x_N$, $y_N$) for the object of interest. Additionally, the user can optionally specify a user-specified scale factor 223, which can be used to modify the object size according to a user preference. (Optional features are shown in the figures using dashed lines.)

In another embodiment, the new 3-D object locations 222 for the objects of interest may be computed based upon an analysis of the preferred disparity and perspective of foreground objects in a stereoscopic scene for a typical viewer. For example, a typical viewer can comfortably fuse images within a particular disparity range. This disparity range will define a corresponding comfortable depth range. If an image contains objects outside of this comfortable depth range, they can be repositioned to be within the comfortable depth range.

Figure 4:
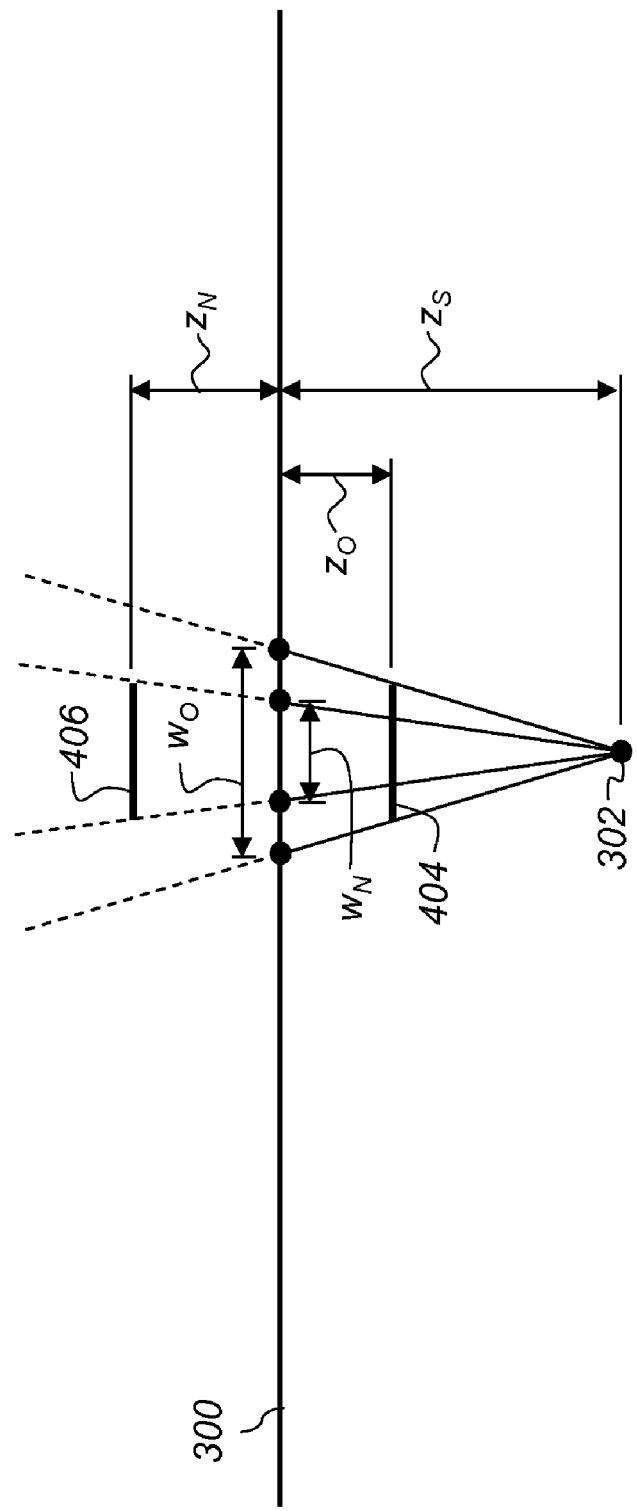
FIG. 4 is a diagram illustrating a change in the actual object size associated with moving an object to a new three-dimensional object location.

The determine magnification and displacement step 224 determines size magnification factors 226 and location displacement values 228 for each of the objects of interest 208. The size magnification factors 226 and location displacement values 228 can be calculated using any method known to one skilled in the art. A method for determining the size magnification factors 226 according to a preferred embodiment of the present invention is illustrated in FIG. 4, which illustrates a stereoscopic image presented on the viewing screen 300, from the left viewpoint 302. The left viewpoint 302 corresponds to the location of the left eye of a viewer. The original 2-D object size corresponding to the left size and location 212 is, given by $w_O$. This corresponds to a perceived original 3-D object size 404 located at a distance $z_O$ from the screen.

The object is repositioned to a new location at a distance $z_N$ from the screen, and is assigned a perceived new 3-D object size 406. By default, the perceived new 3-D object size 406 would be equal to the perceived original 3-D object size 404, which would correspond to the case where an object is simply moved around within the 3-D environment. However, the user can also specify an optional user-specified scale factor 223 describing a desired change in the magnification of the object. A new 2-D object size is shown as $w_N$, corresponding to the new perceived 3-D object size 406. The size magnification factor 226 is given by the following equation:

$$SMF = \frac{w_N}{w_O} = M_U * \frac{z_S + z_O}{z_S + z_N}. \quad (3)$$

where SMF is the size magnification factor 226, $M_U$ is the user-specified scale factor 223, $z_S$ is distance of the screen from the viewer, $z_O$ is the z coordinate of the original 3-D object location 220 and $z_N$ is the z coordinate of the new 3-D object location 222.

A method for determining the location displacement values 228 according to a preferred embodiment of the present invention is illustrated in FIG. 5, which illustrates a stereoscopic image presented on the viewing screen 300 located at a screen distance $z_S$ from the left viewpoint 302 and the right viewpoint 304, which are separated by a distance P. The left viewpoint 302 and the right viewpoint 304 correspond to the locations of the left and right eyes of a viewer, respectively. The two-dimensional original object location for an object of interest in the left input image 202 (FIG. 2) is given by ($x_{LO}$, $y_O$), corresponding to the left size and location 212. Similarly, the two dimensional original object location for the object of interest in the right input image 204 (FIG. 2) is given by ($x_{RO}$, $y_O$), corresponding to the right size and location 216. The x-coordinate ($x_O$) for the original 3-D object location 220 is given by Eq. (1) described above, and the z-coordinate ($z_O$) for the original 3-D object location 220 is given by Eq. (2) above. The x-, y- and z-coordinates ($x_N$, $y_N$, $z_N$) for the new 3-D object location 222 are either specified by the user or computed automatically as described above.

The change in the 3D object location from the original 3-D object location 220 to the new 3-D object location 222 results in a change in the disparity between the object locations in the left and right images. The new disparity is given by $d_N = x_{RN} - x_{LN}$. The change in the disparity ($d_N - d_O$) is related to the change in the 3D object location by the equation:

$$d_N - d_O = P\left(\frac{z_N}{z_N + z_S} - \frac{z_O}{z_O + z_S}\right) \quad (4)$$

The location displacement value 228 represents the change in the 2-D object location resulting from the change in depth when the object is moved to the new 3-D object location 222. The magnitude of the location displacement value 228 is given by half of the change in the disparity:

$$LDV = (d_N - d_O)/2 = \frac{P}{2}\left(\frac{z_N}{z_N + z_S} - \frac{z_O}{z_O + z_S}\right). \quad (5)$$

where LDV is the location displacement value 228, $d_O$ is the original disparity and $d_N$ is the new disparity. The location displacement value 228 is added to the x-coordinate of the object in the right image and subtracted from the x-coordinate of the object in the left image.

A generate new stereo image step 230 is used to create a new left image 232 and a new right image 234 by magnifying the objects of interest 208 using the size magnification factors 226 given in Eq. (3), and shifting their locations according to the location displacement values 228. As discussed earlier, the locations for the objects of interest 208 can be specified using the center location of the bounding box containing the object, or using some other metric such as the centroid of the segmented region.

The x-coordinate for the new 2-D object location in the new left image 232 can be determined by:

$$x_{LN} = x_{LO} + (x_N - x_O) - LDV, \quad (6)$$

where LDV is the location displacement value 228, $x_{LO}$ is the x-coordinate of the original 2-D object location in the left input image 202, $x_O$ is the x-coordinate for the original 3-D object location 220, and $x_N$ is the x-coordinate for the new 3-D object location 222.

Similarly, the x-coordinate for the new 2-D object locations in the new right image 234 can be determined by:

$$x_{RN} = x_{RO} + (x_N - x_O) + LDV, \quad (7)$$

where $x_{RO}$ is the x-coordinate of the original 2-D object location in the right input image 204.

The y-coordinate for the new 2-D object location in the new left image 232 and new right image 234 will both be equal to the y-coordinate for the new 3-D object location 222 ($y_N$):

$$y_{LN} = y_{RN} = y_N. \quad (8)$$

The new left image 232 and the new right image 234 are formed by modifying the left input image 202 and the right input image 204, respectively. First, the objects of interest 208 are removed from each of the input images. Next the objects of interest are resized using the size magnification factors 226, and inserted at their new locations specified by Eqs. (6)-(8). As the size and disparity of the objects of interest 208 are changed, it is possible that portions of the background, or other objects, that were previously occluded may be exposed. Thus, there may be missing pixels corresponding to portions of the input images which were removed, but were not replaced by the inserted resized objects of interest. In a preferred embodiment, the generate new stereo image step 230 also includes the additional operation of filling in any missing pixel in the new left image 232 and new right image 234. This can be done using any method known to those skilled in the art. Such methods are commonly referred to as "image inpainting."

One method for filling in missing pixels is to copy pixels from similar image regions. For example, the right input image 204 may contain pixels corresponding to missing pixels in the new left image 232. Alternately, the missing pixels can be replaced using pixels from image regions having similar color and texture. The image regions can be from either the left input image 202, the right input image 204, or even from other input images. For example, the paper "Region Filling and Object Removal by Exemplar-Based Image Inpainting" by Criminisi et al. (IEEE Transactions on Image Processing, Vol. 13, 2004) teaches copying pixels from neighboring regions in the same image to replace missing pixels when an object is removed from an image. Similarly, the paper "Get out of my picture! Internet-based inpainting" by Whyte et al.

(Proc. British Machine Vision Conference, 2009) teaches copying image regions from other source images found on the internet.

In another embodiment, the pixel holes can be filled by image data synthesized using nearby unoccluded portions of the input image. For example, the article "Projection based image and video inpainting using wavelets" by Patwardhan et al. (Proc. International Conference on Image Processing, 2003) teaches synthesizing missing pixel data by first dividing the region of missing pixels into blocks, then using wavelet domain operations to iteratively determine which of the blocks to fill and synthesizing the missing pixels in that block using wavelet coefficients. Similarly, the paper "Digital inpainting based on the Mumford-Shah-Euler image model" by Esedoglu et al. (European Journal of Applied Mathematics, Vol. 13, 2002) uses a computational model based on edge gradient functions to synthesize the missing pixel data.

One skilled in the art will recognize that the above-described method can easily be extended to process stereoscopic images that are comprised of more than two viewpoints. For example, in addition to the left input image 202 corresponding to the left viewpoint 302 and the right input image 204 corresponding to the right viewpoint, a stereoscopic image can include a third input image corresponding to a third viewpoint. The object locations and sizes in each of the input images can be adjusted using the process described above by generalizing the equations to include more than two input images, or by processing the input images two at a time.

Finally, once the new left image 232 and the new right image 234 have been generated, a store new stereo image step 236 is used to store the new stereoscopic image pair in a processor-accessible memory system such as the data storage system 140 (FIG. 1). The new left image 232 and the new right image 234 can be stored using any method known to those skilled in the art. For example, the new left image 232 and the new right image 234 can each be stored in a digital image file using the well-known EXIF (JPG) file format. If the new left image 232 and the new right image 234 correspond to frames of a stereoscopic video image, then the images will generally be stored in a video file format, such as the well-known H.264 (MPEG-4) video file format. The stored images can then be accessed by a user and used to form a displayed stereoscopic image using any stereoscopic display method known to those skilled in the art. In one common stereoscopic display method, the left and right images are displayed using light having orthogonal polarization states, and the viewer wears polarized glasses having corresponding polarization filters. In other common stereoscopic display methods, the left and right images are displayed with different colors and viewed using glasses with different colors, or are displayed at alternating times and viewed using glasses which alternately block the light to the left and right eye.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST 110 data processing system
120 peripheral system
130 user interface system
140 data storage system
200 receive stereo image step
202 left input image
204 right input image
206 identify objects step
208 objects of interest
210 determine left size and location step
212 left size and location
214 determine right size and location step
216 right size and location
218 determine original 3-D location step
220 original 3-D object locations
222 new 3-D object locations
223 user-specified scale factor
224 determine magnification and displacement step
226 size magnification factors
228 location displacement values
230 generate new stereo image step
232 new left image
234 new right image
236 store new stereo image step
300 viewing screen
302 left viewpoint
304 right viewpoint
404 original 3-D object size
406 new 3-D object size

The invention claimed is:

1. A method for manipulating an original stereoscopic image, comprising:
   a) receiving the original stereoscopic image including a left image corresponding to a left viewpoint and a right image corresponding to a left viewpoint;
   b) identifying one or more objects represented in both the left and right images;
   c) determining actual object sizes and actual object locations of the identified one or more objects in both the left and right images;
   d) determining original perceived three-dimensional object locations for the identified one or more objects responsive to the actual object locations in the left and right images;
   e) determining new perceived three-dimensional object locations for the identified one or more objects;
   f) determining a size magnification factor for each of the one or more objects based at least upon the original perceived three-dimensional object location and the new perceived three-dimensional object location for the corresponding object;
   g) determining location displacement values for each of the one or more objects based at least upon the original perceived three-dimensional object location and the new perceived three-dimensional object location for the corresponding object;
   h) using a data processing system to generate a new stereoscopic image including a new left image and a new right image by changing the actual object sizes and the actual object locations for the one or more objects responsive to the corresponding size magnification factors and location displacement values; and
   i) storing the new stereoscopic image in a processor-accessible memory system.

2. The method of claim 1 wherein step e) includes receiving a control signal from a viewer specifying the new perceived three-dimensional object location.

3. The method of claim 2 wherein the control signal is received using a graphical user interface.

4. The method of claim 1 wherein step e) includes determining the new perceived three-dimensional object location to reposition the identified object to be within a specified depth range for comfortable viewing.

5. The method of claim 1 wherein the size magnification factor (SMF) is determined using the equation:

$$SMF = \frac{z_S + z_O}{z_S + z_N}$$

where $z_S$ is distance from a viewer to a viewing screen, $z_O$ is the z-coordinate of the original perceived three-dimensional object location relative to the screen and $z_N$ is the z-coordinate of the new perceived three-dimensional object location relative to the screen.

6. The method of claim 1 wherein step f) includes receiving a control signal from a user specifying a scale factor, and wherein the size magnification factor is also responsive to the user-specified scale factor.

7. The method of claim 6 wherein the size magnification factor (SMF) is determined using the equation:

$$SMF = M_U * \frac{z_S + z_O}{z_S + z_N}$$

where $M_U$ is the user-specified scale factor, $z_S$ is distance from a viewer to a viewing screen, $z_O$ is the z-coordinate of the original perceived three-dimensional object location relative to the screen and $z_N$ is the z-coordinate of the new perceived three-dimensional object location relative to the screen.

8. The method of claim 1 wherein the location displacement value (LDV) is determined using the equation:

$$LDV = \frac{P}{2}\left(\frac{z_N}{z_N + z_S} - \frac{z_O}{z_O + z_S}\right)$$

where P is a distance between left and right viewpoints corresponding to a viewer's left and right eyes, $z_S$ is distance from the viewer to a viewing screen, $z_O$ is the z-coordinate of the original perceived three-dimensional object location relative to the screen and $z_N$ is the z-coordinate of the new perceived three-dimensional object location relative to the screen.

9. The method of claim 1 wherein step h) includes applying an image inpainting algorithm to fill in previously occluded image regions that are visible in the new stereoscopic image.

10. The method of claim 1 wherein the original stereoscopic image corresponds to a frame of a stereoscopic video sequence.

11. The method of claim 1 wherein the original stereoscopic includes at least a third image corresponding to a third viewpoint.

12. A system comprising:
   a data processing system; and
   a memory system communicatively connected to the data processing system and storing instructions configured to cause the data processing system to implement a method for manipulating an original stereoscopic image, wherein the instructions comprise:
      receiving the original stereoscopic image including a left image corresponding to a left viewpoint and a right image corresponding to a left viewpoint;
      identifying one or more objects represented in both the left and right images;
      determining actual object sizes and actual object locations of the identified one or more objects in both the left and right images;
      determining original perceived three-dimensional object locations for the identified one or more objects responsive to the actual object locations in the left and right images;
      determining new perceived three-dimensional object locations for the identified one or more objects;
      determining a size magnification factor for each of the one or more objects based at least upon the original perceived three-dimensional object location and the new perceived three-dimensional object location for the corresponding object;
      determining location displacement values for each of the one or more objects based at least upon the original perceived three-dimensional object location and the new perceived three-dimensional object location for the corresponding object;
      generating a new stereoscopic image including a new left image and a new right image by changing the actual object sizes and the actual object locations for the one or more objects responsive to the corresponding size magnification factors and location displacement values; and
      storing the new stereoscopic image in the memory system.

13. A computer program product for manipulating an original stereoscopic image comprising a non-transitory computer readable storage medium storing an executable software application for causing a data processing system to perform the steps of:
   a) receiving the original stereoscopic image including a left image corresponding to a left viewpoint and a right image corresponding to a left viewpoint;
   b) identifying one or more objects represented in both the left and right images;
   c) determining actual object sizes and actual object locations of the identified one or more objects in both the left and right images;
   d) determining original perceived three-dimensional object locations for the identified one or more objects responsive to the actual object locations in the left and right images;
   e) determining new perceived three-dimensional object locations for the identified one or more objects;
   f) determining a size magnification factor for each of the one or more objects based at least upon the original perceived three-dimensional object location and the new perceived three-dimensional object location for the corresponding object;
   g) determining location displacement values for each of the one or more objects based at least upon the original perceived three-dimensional object location and the new perceived three-dimensional object location for the corresponding object;
   h) using a data processing system to generate a new stereoscopic image including a new left image and a new right image by changing the actual object sizes and the actual object locations for the one or more objects responsive to the corresponding size magnification factors and location displacement values; and
   i) storing the new stereoscopic image in a processor-accessible memory system.

* * * * *